(12) United States Patent
Bodley et al.

(10) Patent No.: US 8,744,087 B2
(45) Date of Patent: Jun. 3, 2014

(54) WIRELESS MULTI-USER AUDIO SYSTEM

(75) Inventors: Martin Reed Bodley, Sudbury, MA (US); Jean-Pierre Carney, Sudbury, MA (US)

(73) Assignee: Revo Labs, Inc., Sudbury, MA (US)

( * ) Notice: Subject to any disclaimer, the term of this patent is extended or adjusted under 35 U.S.C. 154(b) by 240 days.

(21) Appl. No.: 13/147,957

(22) PCT Filed: Feb. 8, 2010

(86) PCT No.: PCT/US2010/023480
§ 371 (c)(1),
(2), (4) Date: Sep. 23, 2011

(87) PCT Pub. No.: WO2010/091349
PCT Pub. Date: Aug. 12, 2010

(65) Prior Publication Data
US 2012/0014534 A1      Jan. 19, 2012

Related U.S. Application Data

(60) Provisional application No. 61/151,037, filed on Feb. 9, 2009.

(51) Int. Cl.
*H04H 40/54* (2008.01)
*H04M 1/00* (2006.01)

(52) U.S. Cl.
USPC ........................................ 381/10; 455/556.1

(58) Field of Classification Search
CPC .............................. H04N 7/15; H04M 1/72502
USPC ............... 381/10, 27, 77, 80, 85; 379/399.01; 375/227; 700/94; 455/450–455
See application file for complete search history.

(56) References Cited

U.S. PATENT DOCUMENTS

| | | | |
|---|---|---|---|
| 6,636,603 B1 * | 10/2003 | Milbrandt | ................ 379/399.01 |
| 6,671,520 B1 | 12/2003 | Kim | |
| 7,242,761 B1 * | 7/2007 | Milbrandt | ................ 379/399.01 |
| 2002/0013149 A1 * | 1/2002 | Threadgill et al. | ............ 455/427 |
| 2002/0018450 A1 | 2/2002 | McKenna et al. | |
| 2004/0039462 A1 | 2/2004 | Chen | |
| 2005/0153716 A1 | 7/2005 | Bodley | |
| 2005/0265430 A1 * | 12/2005 | Ozluturk et al. | .............. 375/145 |
| 2005/0288014 A1 * | 12/2005 | Rajkotia et al. | ............... 455/433 |

FOREIGN PATENT DOCUMENTS

JP    2005-341618 A    12/2005

OTHER PUBLICATIONS

International Search Report and Written Opinion, PCT/2010/023480, dated Oct. 12, 2010.

* cited by examiner

*Primary Examiner* — Fan Tsang
*Assistant Examiner* — Eugene Zhao
(74) *Attorney, Agent, or Firm* — Robert Schuler

(57) ABSTRACT

Various methods and devices are provided for a wireless audio system for a number of users. The system includes a base unit that is adapted to removably store, recharge and communicate with various communication modules, including personal microphone modules, table-top microphones, and audio adapters. The system also includes a plurality of personal microphone modules that are each adapted to be removable and coupled, for example, to a user's clothing, and further, are adapted to communicate wirelessly with the base unit, and table-top microphones that are adapted to communicate wirelessly with the base unit.

17 Claims, 10 Drawing Sheets

WIRELESS MULTI-USER AUDIO SYSTEM

BACKGROUND

Audio teleconferencing has grown in popularity. Commonly, the audio systems use a tabletop microphone. The users must thus always be relatively close to the microphone, and also must always be aware of the direction in which they are speaking. Such systems thus intrude on the meeting. In addition, as the microphones are omni-directional and located on the tabletop, they pick up and transmit to the remote participants undesirable ambient noise. Common sources of unwanted ambient noise include table noise, sidebar conversations, laptop keyboard clicks, coffee cup clinks, etc. These 'unwanted' audio sources are very damaging to the efficiency, focus and productivity of conference meetings, especially for far-end (remote) participants in the conference.

SUMMARY

This invention features a novel wireless audio system, which enables optimal audio input from one or more parties actively participating in audio conferencing, (telephony, video, net meetings) or voice recording applications.

The present invention provides various devices and methods for use with a wireless audio system. In one embodiment, a wireless audio system is provided and includes a base unit configured to removably store, recharge, and communicate with one or more communication modules. The base unit has a channel density controller configured to control audio bandwidth to adjust the number of communication modules that can communicate with the base unit. The communication module is selected from the group consisting of a personal microphone module, a table-top microphone, and an audio adapter.

The communication modules can have various forms. In one exemplary embodiment, the personal microphone module includes a microphone that is adapted to be removably coupled to a user, and to communicate wirelessly with the base unit, and the audio adapter is configured to removably couple to a wireless microphone and to communicate wirelessly with the base unit. In one exemplary embodiment, a wireless link can be automatically established between the communication module and the base unit when the communication module is removed from the base unit. The wireless link can be automatically terminated when the communication module that had been removed from the base unit is returned to the base unit. The base unit can perform audio mixing and automatic gain control from the communication modules that are wirelessly linked to the base unit. In an exemplary embodiment, each communication module can uniquely register with the base unit, is inactivated, and uniquely registers with a further base unit. Each communication module can also include a battery that can be charged wirelessly. For example, the base unit can include an inductive antenna configured to wirelessly communicate with an inductive receiver in the communication modules to allow for wireless charging of the communication modules.

The audio system can include various features to mute the communications modules. In one exemplary embodiment, each communication module includes a mutable microphone, for example, a directional microphone. The communication module can be automatically muted when the communication module is removed from the base unit. In one exemplary embodiment, each communication module can include a microphone mute-status indicator, which can be in the form of an indicator light carried by the communication module.

The base unit can also include a muting controller that is configured to select a muting scheme to control an audio channel to each communication module to selectively mute the communication modules. The muting controller can mute one or more of the communication modules by blocking the audio signals from the communication modules.

The base unit can also include an audio bandwidth controller configured to control the quality of the audio of the communication modules.

In another embodiment, a wireless audio system is provided that includes a base unit that is adapted to removably store, recharge and communicate with at least one communication module. The communication module is selected from the group consisting of a personal microphone module, a table-top microphone, and an audio adapter, and is adapted to communicate wirelessly with the base unit. The base unit includes a muting controller that is configured to select a muting scheme to control an audio channel to each communication module to selectively mute the communication modules.

In yet another exemplary embodiment, a wireless audio system is provided that includes a base unit that is adapted to removably store, recharge and communicate with at least one communication module. The communication module is selected from a group consisting of a personal microphone module, a table-top microphone, and an audio adapter, and is adapted to communicate wirelessly with the base unit. The base unit is configured to distinguish between each type of communication module, and includes an audio equalization controller that is configured to customize the audio quality for each type of communication module. The base unit can also include an audio profile for each type of communication module such that the audio quality for each type of communication module is set automatically by the base unit.

In another exemplary embodiment, the system includes a clip-on personal microphone module (PMM) and/or a table-top microphone and/or an audio adapter. One or more PMMs, table-top microphones, and audio adapters communicate with a base station, which in the preferred embodiment can support up to 12 individual PMMs and/or table-top microphones and/or audio adapters. The base station performs audio mixing and automatic gain control from all registered PMMs, table-top microphones, and audio adapters, PMM, table-top microphone, and audio adapter battery charging, and connectivity to audio patch panels or other conferencing equipment. The users remove a PMM from the holder/charger when they enter a conference call, clip the PMM onto their shirt pocket or lapel, and return the PMM to the holder when they are done.

By using discrete and wireless PMMs, located near each speaker's mouth, the system provides superior audio quality for those participants on the far-end of the conference. This is further accomplished through a combination of audio processing and the optimal positioning of the directional microphone within the PMM, which attenuates and filters ambient noise before mixing with the outgoing audio signal. Additionally, the sound quality provided by this system is ideally suited for recording purposes.

RF wireless transceivers built into each PMM enable all users to operate freely during the meeting without being tethered to wires or requiring line-of-sight to the base station. Users can even leave the room, and still participate in the call, as a plug-in ear bud allows the user to hear the received audio that is transmitted by the base station. A mute button located on the PMM allows users to cough/sneeze or have offline conversations without distracting the meeting. With a PMM, the user will forget about the microphone and focus on the discussion, unlike when the users employ headsets or table-top microphones.

The system also includes a base station that provides wireless gateway and audio multiplexing along with the connectivity required to interface with existing audio equipment located in the conference room. Two types of base units are provided for:

(1) Rack mount for installation within an existing A/V system rack in a high end A/V type room. With this type of base, the PMMs typically are stored in a separate holder/charger base unit that can be located anywhere in the room.

(2) Tabletop, which will integrate the wireless hub and PMM holder/charging station functions in a stylish form factor.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Various exemplary methods and devices are provided for an audio system that is adapted for wireless communication between multiple users. While such an audio system can have a variety of configurations, in one exemplary embodiment, the system can include one or more communication modules. A communication module can be any component that can communicate with the audio system, including but not limited to personal microphone modules (PMMs), table-top microphones, audio adapters, or any other device that can be adapted to communicate with at least one base unit to facilitate communication between multiple users.

COMPONENTS OF THE SYSTEM

Personal Microphone Modules (PMMs)

The PMM 10 Performance/Feature set can include (see FIGS. 1A and 1B) a highly directional microphone with audio processing and secure and reliable RF performance. The features set can also include extended battery life through smart power management, compact size and light weight, and system software/MMI (Machine Man Interface) that is simple to use with sophisticated performance results.

Figure 1A:
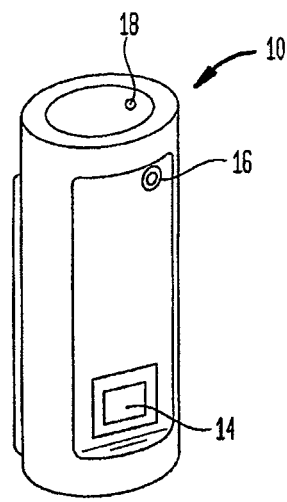
FIGS. 1A and 1B are drawings of one exemplary embodiment of a personal microphone module.
Figure 1B:
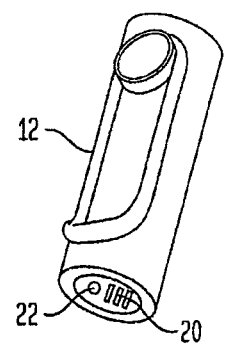
Figure 1C:
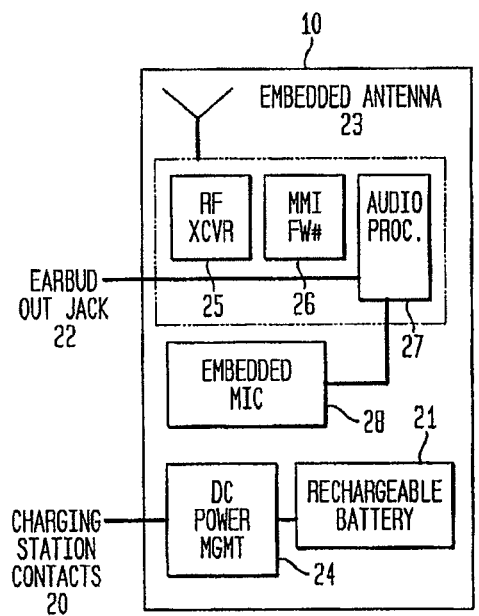
FIG. 1C is a functional block diagram of the PMM shown in FIGS. 1A and 1B.

In the preferred embodiment, a PMM 10, shown in FIGS. 1A-1C, includes a microphone input 18 that is adapted to collect sound from a user of the PMM 10 and a mute button 14 to mute the PMM 10. The PMM 10 further includes a visual indicator, for example, an LED 16 to indicate various types of status information to the user, discussed in more detail below. A user attachment component, such as a clip 12 shown in FIG. 1B, is included to attach the PMM 10 to the user. A contact 20 is disposed on the surface of the PMM 10 and is adapted to couple to a charger to charge an energy source for the PMM 10, such as a battery 21 shown in FIG. 1C. An earbud audio jack 22 allows the user to hear mixed audio when out of the hearing range of the room speaker (if one is used).

FIG. 1C illustrates a functional diagram of the PMM 10 shown in FIGS. 1A-1B. The rechargeable battery 21 is charged when the contact 20 couples with a charger. The charging of the battery 21 is controlled by a DC power management component 24. The microphone 28 picks up sounds from the user and transmits that information to an audio processing component 27 for processing. The audio processing component 27 is in electrical communication with the earbud output jack 22 to transmit mixed audio to the earbud output jack 22. A RF XCVR 25 (Radio Frequency Transceiver) is one half of a wireless link comprised of hardware and software that enables full duplex (transmit & receive) communication of audio signals between two points. A MMI FW 26 (Man Machine Interface Firmware) refers to software that enables a particular user experience to be achieved, namely how the visual cues, audio cues, or button presses allow the user to operate the product. Typically these functions are implemented on a microprocessor or digital signal processor (DSP) and may be combined with functions of the RF XCVR 25 and audio processing such as noise removal, echo cancellation and frequency equalization.

Properly achieving the performance and feature-set of the PMM are important to obtaining the most benefit to an audio conference. The directionality of the microphone acoustics rejects sound coming from below or either side of the user. As shown in FIGS. 1A-1B, an exemplary embodiment of a PMM 10 includes a component that is adapted to allow the PMM 10 to be carried by a user. For example, as shown in FIG. 1A, the PMM 10 has a clip 12 that allows it to be carried by clothing (e.g., a shirt pocket, neck tie or lapel) that places the microphone input 18 in close proximity to the speaker's mouth, which minimizes general background noise as well as cross talk between people in the room. Physical dimensions and ergonomics assist in positioning the PMM at the optimum location close to the user's mouth. Typical locations include shirt pockets, lapels or button seams. A variety of other components can be used to attached the PMM 10 to a user. For example, lanyards can also be used if no suitable clipping feature is available on clothing. Radio performance allows farther ranging capability and longer talk times. A visual indicator 16 (e.g., one or more LEDs) conveys radio-link/charging status of each PMM 10. The PMM 10 can also include an antenna 23 as shown in FIG. 2. This antenna can either be internal or external to the PMM 10. As shown in FIG. 2, the antenna 23 is an internal embedded antenna.

The PMM 10 includes a power source, for example, a battery. The battery can be a rechargeable battery 21, shown in FIG. 2, such as a LiPolymer rechargeable battery cell. Other examples of batteries include a lithium rechargeable battery, such as a lithium ion battery, a NiMH rechargeable battery, and alkaline primary cells, either in a cylinder or coin cells. A person skilled in the art will appreciate that any type or configuration of single or multiple batteries that can function to supply power to the PMM can be acceptable.

A memory chip can be included with the PMM 10 which can store software needed to operate the PMM. A person skilled in the art will appreciate that any chip capable of storing software can be used. The software provides a variety of functionality for the PMM 10, as described below.

The memory can include one or more components, such as a FLASH memory and/or a non-volatile storage, for example, an EEPROM. The non-volatile storage can be used to store a variety of information, including one or more subscription records containing information about the base units that the PMM 10 subscribes to, and the most recent subscription choice between those base units. The non-volatile storage can further include, by way of non-limiting example, information regarding DECT identity, allowed carrier set, radio calibration parameters, bandgap reference trim, and battery threshold voltages.

In one exemplary embodiment, all the features and internal structure described above relative to the PMMs can also be features of the table-top microphones, as described in more detail below.

Table-Top Microphones

Figure 8A:
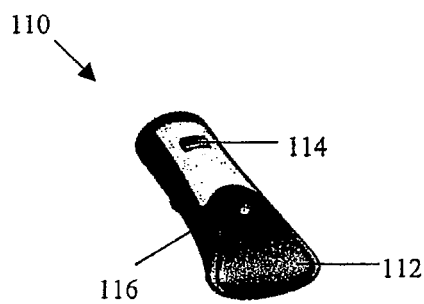
FIGS. 8A and 8B are drawings of one exemplary embodiment of a table-top microphone.
Figure 8B:
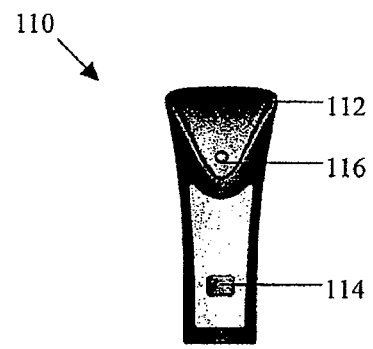

In one embodiment, the audio system can also include one or more wireless table-top microphones, shown in FIGS. 8A-8B. In a preferred embodiment, a table-top microphone 110 can include an input 112 adapted to collect sound and a mute button 114 to mute the table-top microphone. The table-top microphone 110 can also include a visual indicator, such as an LED 116 to indicate various types of status information. A contact (not shown) disposed on the surface of the table-top microphone 110 is adapted to couple to a charger of a base unit to charge an energy source for the table-top microphone 110, such as a battery. While the table-top microphone 110 can have a variety of shapes and sizes, it has a generally rectangular shape with a widened proximal end for collecting sound, and a distal end of a size and shape to allow the table-top microphone 110 to fit into a charger of a base unit, allowing both the table-top microphones 110 and the PMMs 10 to be charged using the same base unit, as discussed below. In one exemplary embodiment, the table-top microphone 110 has similar features and components as described above relative to the PMMs, except the table-top microphone 110 is adapted to sit on a surface, such a table, and can be used by one or more users.

The table-top microphones 110 can include a variety of additional features, such as a range of 30 m, and an audio bandwidth of 200-8000 Hz. The table-top microphone 110 can collect sound in a variety of ways, including directional and omni-directional patterns. The table-top microphone 110 can also include encryption, such as a 128-bit proprietary encryption per microphone channel.

Audio Adapters

In one embodiment, the audio system can also include one or more wireless audio adapters, shown in FIGS. 10-13, that can removably couple to a conventional wireless microphone, allowing the conventional wireless microphone to be used with the audio system. In a preferred embodiment, an audio adapter 210 can include an input (not shown) adapted to collect sound and a mute button 214 to mute the audio adapter. In one embodiment, the mute button 214 can have additional functions, such as the ability to turn the audio adapter 210 on and off, and the ability to establish a subscription and connection between the audio adapter 210 and a base unit. The audio adapter 210 can also include a visual indicator, such as an LED 216 to indicate various types of status information. By way of non-limiting example, the LED 216 can be used in indicate a live or muted state of the audio adapter 210, battery status, charging status, and whether the audio adapter 210 is out of range and/or is searching for a base unit. A contact 218 disposed on a surface of the audio adapter 210 is adapted to couple to a charger of a base unit to charge an energy source for the audio adapter 210, such as a battery. The battery can be, for example, a rechargeable battery, such as a lithium polymer battery or a lithium ion battery.

While the audio adapter 210 can have a variety of shapes and sizes, it has a generally cylindrical shape having a distal end of a size and shape to allow the audio adapter 210 to fit into a charger of a base unit, allowing the audio adapter 210, the table-top microphones 110, and the PMMs 10 to be charged using the same base unit, as discussed below. A proximal end of the audio adapter 210 is sized and shaped to allow the audio adapter 210 to removably couple to a conventional wireless microphone. In one exemplary embodiment, the audio adapter 210 has similar features and components as described above relative to the PMMs, except that the audio adapter 210 is adapted to removably couple to a conventional wireless microphone.

As discussed above, the proximal end of the audio adapter 210 is adapted to removably couple to a conventional wireless microphone. In one exemplary embodiment, the proximal end of the audio adapter 210 can include a connector 220 adapted to couple to a conventional wireless microphone. By way of non-limiting example, the connector 220 can be a female connector adapted to mate to a conventional wireless microphone having a corresponding male connector attached thereto. For example, the female connector can be an XLR 3-pin female connector. Examples of conventional wireless microphones that can be used with the audio adapter 210 include the Shure SM58. A release mechanism, such as a latch 222, can also optionally be included and can be adapted to disengage the connector 220 from the conventional wireless microphone. A person skilled in the art will appreciate that any mechanism can be used to facilitate the connection and disengagement of the connector to a conventional wireless microphone, and that the connection and disengagement between the connector and the conventional wireless microphone can also be achieved without the use of any type of mechanism.

The audio adapter 210 can also include other optional features. For example, the audio adapter 210 can include an audio jack 224 that is adapted to receive a hearing accessory, such as headphones or an earpiece. This allows for full duplex, two-way audio.

Base Units

The Base Unit 30, 50, 60 Performance/Feature-set can include (see FIGS. 2A and 2B, 3A and 3B, and 4A and 4B) standard audio interface, automatic audio mixing and gain control, secure and reliable RF performance, and system software/MMI that is simple to use and has sophisticated performance results. The base unit feature set can be modular, having the ability to add base units with more PMMs and/or table-top microphones and/or audio adapters and to increase the number of users per room.

Figure 9:
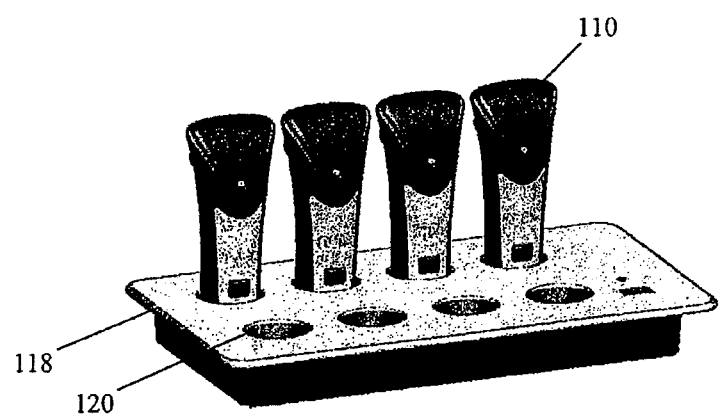
FIG. 9 is a drawing of a plurality of table-top microphones, shown in FIGS. 8A-8B, in a charging base.
Figure 10:
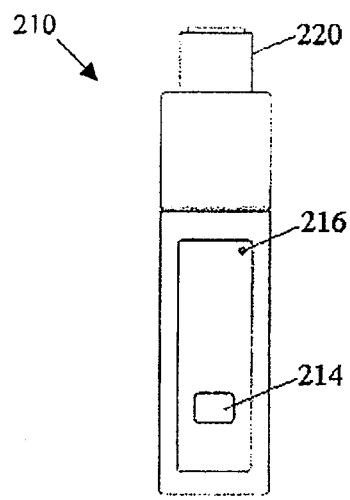
FIG. 10 is a drawing of a front view of one exemplary embodiment of an audio adapter.
Figure 11:
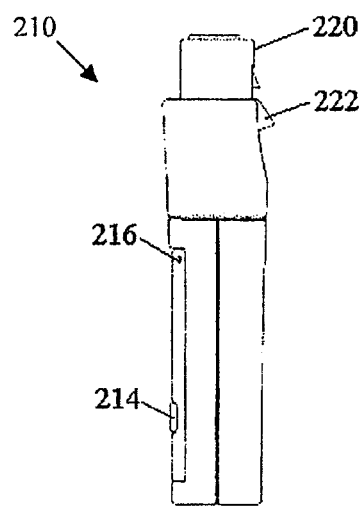
FIG. 11 is a drawing of a side view of the audio adapter of FIG. 10.
Figure 12:
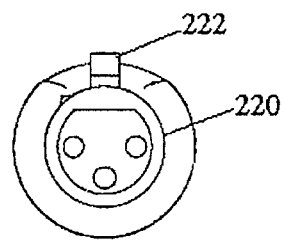
FIG. 12 is a drawing of a top view of the audio adapter of FIG. 10.
Figure 13:
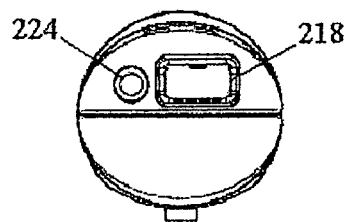
FIG. 13 is a drawing of a bottom view of the audio adapter of FIG. 10.

While the base units are described with the use of one or more PMMs, it should be understood that the system described below can be used with PMMs only, table-top microphones only, audio adapters only, or any combination of PMMs, table-top microphones, and audio adapters. The PMMs, table-top microphones, and audio adapters can all be charged with the same base units, as described in more detail below. For example, a base unit 118 and docking port 120 shown in FIG. 9 with the table-top microphones 110 is similar to base units 30, 50, and 60 and docking ports 36, 68 shown in FIGS. 2A-4B. This allows for increased flexibility in the number of users and room configurations for use with the audio systems described herein. In one exemplary embodiment, up to 16 PMMs and/or table-top microphones and/or audio adapters can be used in a single room. In another embodiment, up to 24 PMMs, table-top microphones, and audio adapters can be used in a single room.

Base unit features are important in achieving a system that is simple to setup and use with any existing A/V equipment. The use of industry standard connectors, audio levels, and naming conventions simplifies integration into existing installations. The base unit automatically adjusts for any PMM installed into any docking port 38, 68 of the base unit (i.e., the PMMs are hot swappable). The base unit handles all of the audio multiplexing and gain adjustments, such that all PMM audio levels are equal prior to being combined and presented at the audio connector.

The form of the base unit is important to how the device will be used, where it is located in the room, and how readily the PMMs can be made available to users. The base unit can have a variety of configurations, shapes and sizes. In one exemplary embodiment, the base unit is designed such that it can be located in the middle of a table, on a credenza or mounted on a wall. This base unit can communicate with a plurality of PMMs and can be located, for example, in a conference room to be used in audio and/or audio-video conferencing with a variety of users. The base unit can include ports that are adapted to charge the PMMs and synchronize the PMMs to the base unit. These ports can be integrated to perform both of these functions, or the base unit can include separate ports dedicated to each function. For example, a base unit can include eight ports, each of which can charge the PMMs and synchronize them with the base unit. In another embodiment, all eight ports can be adapted to charge the PMMs and the synchronization can be accomplished separately, such as wirelessly or using radio frequency (RF) without any need for ports located on the base unit for synchronization. In a further embodiment, one or more of the ports can be used for charging, while the remaining port or ports are dedicated to synchronization. A person skilled in the art will appreciate that any combination and number of ports and wireless technology or RF can be used to charge the PMMs and synchronize them with the base unit.

The base unit can have a variety of configurations. The base unit can include a central PCB to support eight audio channels. The PCB carries four DECT RFPs, numbered 0-3 and each identified by a 2-wire stamp. Each DECT is based on a SC14429 baseband plus LMX4169-based radio and $I^2C$ EEPROM. Each SC14429 is connected to various LEDS and controls. In one embodiment, these include two front panel LEDs, two front panel pairing-control buttons, two rear-panel balanced audio inputs, two discrete amplifiers driving balanced rear-panel audio outputs, two logic-level Mute command outputs to a rear-panel DB25 connecytor, and an on-board UART connector for Flash programming and calibration. On the RFP 0, there is a rear-panel switch to select synchronization master/slave mode. All four RFP basebands have common digital wiring for a common system mute control line driven by a simple radio receiver, wire-ORed, with a digital input from the rear panel. They all have a mute mode control line driven by a rear-panel switch, with two modes: local mute and no local mute (an external device will perform muting if commanded to). Further, they have an inter-RFP 100 Hz logic-level synchronization signal which also appears on a rear-panel connector to allow inter-base station synchronization. In one embodiment, RFPs 1, 2, and 3 are synchronization slaves, and RFP 0 is either the master or slave depending on the rear-panel switch. They have an inter-RFP 3-wire SPI bus with RFP 0 as SPI master and the others as SPI slaves (for centralized pairing control), and a reset where all four RFP lines are commoned and driven by a discrete reset chip with open-controller output. The RF connections from the four transceivers are combined into two external antenna connectors, described in more detail below.

Figure 2A:
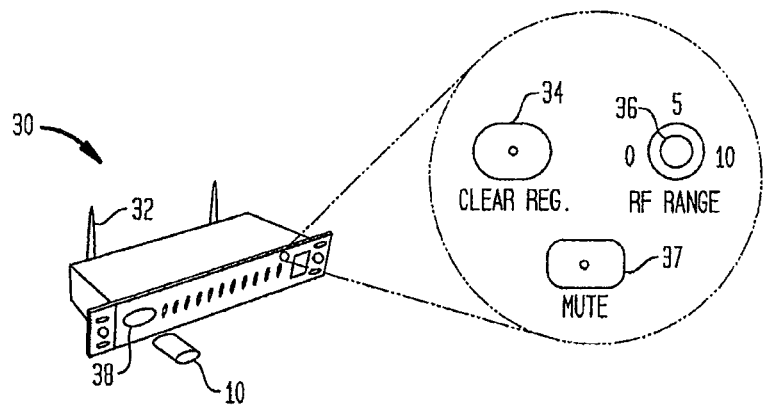
FIG. 2A is a drawing of one exemplary embodiment of a rack mounted base unit.
Figure 2B:
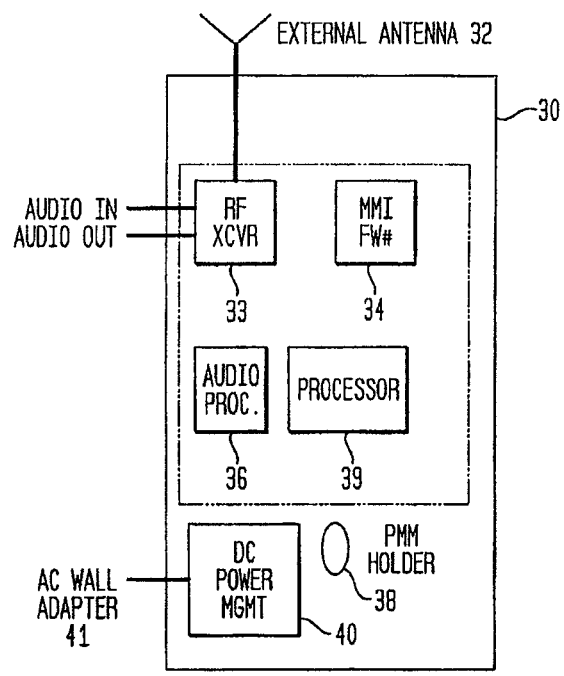
FIG. 2B is a functional block diagram the rack mounted integrated base/gateway unit shown in FIG. 2A.
Figure 3A:
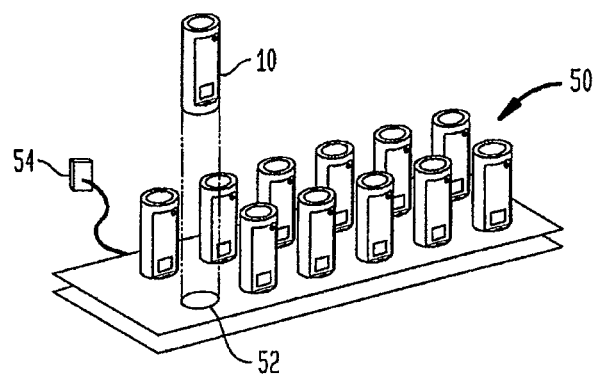
FIG. 3A is a drawing of one exemplary embodiment of a PMM charging base.

In one exemplary embodiment, the system utilizes a rack mounted base unit 30 shown in FIG. 2A with a charge station 50 shown in FIG. 3A, herein referred to as an executive system. In the preferred embodiment, the base unit 30, shown in FIGS. 2A-2B, includes a docking port 38 for registering the PMM 10 with the base unit 30, and a 'clear registration' button 34. The button 34 is used as a security feature, and can be used to clear the registration of the PMM 10 in the docking port 38. The base unit 30 also includes a mute button 37 which controls all the PMMs used with the base unit 30, and an RF range control knob 36 to control the RF range of the PMMs. The charge station 50 includes ports 52 for charging and/or registering the PMMs and an AC wall adapted to supply power to the charging station 50. In the preferred embodiment, the system includes eight PMMs, but a person skilled in the art will appreciate that the number of PMMs used can be varied. In other embodiments, the based unit and charge station can be integrated in one unit, or the charge station can be utilized for other applications separate from the rack mounted base unit. The charge station can be positioned in a number of locations in, for example, a conference room where it is being utilized, such as on a table in the room or wall mounted. The base unit can be access points that are connected, for example, via Ethernet, wirelessly or otherwise, to one or more central management computers that allow for many remote devices to link-up via one or more centrally managed ID access lists and digital audio routing. The central management computers can also include storage and post-processing that enable automated initiatives such as Sarbanes-Oxley compliance and corporate archive and monitoring initiatives.

Figure 3B:
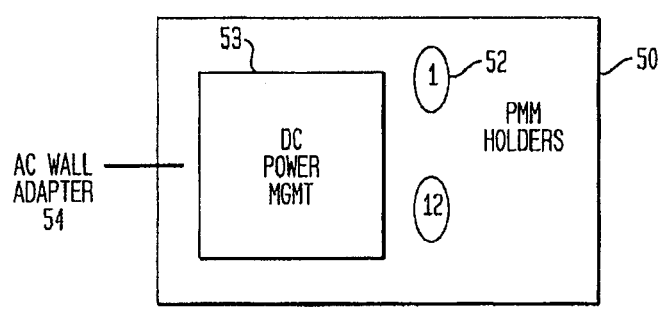
FIG. 3B is a functional block diagram of the PMM charging base shown in FIG. 3A.

FIGS. 2B and 3B illustrate functional diagrams of the base unit 30 shown in FIG. 2A and the charging station 50 shown in FIG. 3A. Power is supplied to the base unit 30 through an AC wall adapter 41 and is controlled by a DC power management component 40. A RF XCVR 33, as stated above, is one half of a wireless link comprised of hardware and software that enables full duplex (transmit & receive) communication of audio signals between two points. The other half of the wireless link can include another RF XCVR. A MMI FW 34 refers to software that enables a particular user experience to be achieved, namely how the visual cues, audio cues, or button presses allow the user to operate the product. Typically these functions are implemented on a microprocessor or digital signal processor (DSP) and may be combined with functions of the RF XCVR 33 and audio processing such as noise removal, echo cancellation and frequency equalization. Power is supplied to the charging station 50 through an AC wall adapter 54 and is controlled by a DC power management component 53.

Figure 4A:
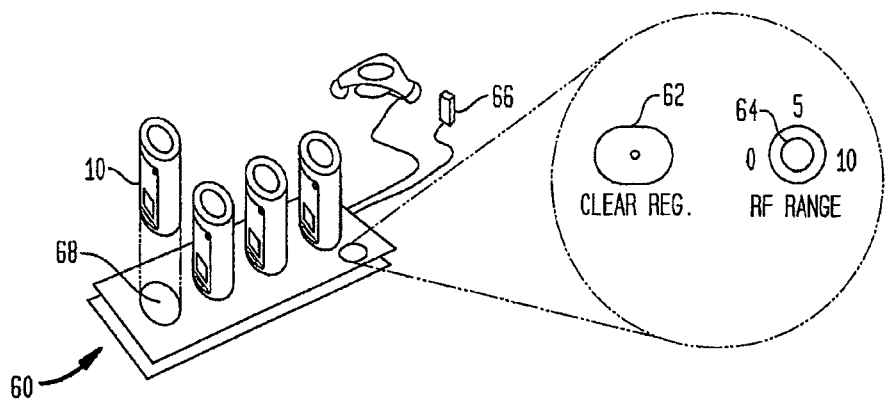
FIG. 4A is a drawing of the preferred physical characteristics.
Figure 4B:
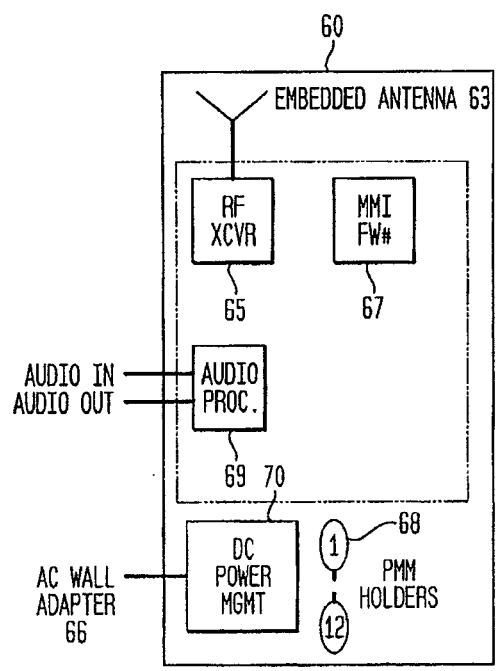
FIG. 4B is a functional block diagram, of a preferred embodiment of an integrated base/gateway/charger for the invention.

FIGS. 4A-4B illustrate an integrated base unit including a base unit and charging station capabilities. One or more docking ports 68 are adapted to hold a PMM 10 for registration and charging of the PMM 10. The integrated base unit includes controls for controlling the PMMs 10, including a clear registration button 62 and an RF range knob 64, discussed in more detail below. An AC wall adapted supplies power to the integrated base unit 60, which is controlled by a DC power management component 70. A RF XCVR 65 is one half of a wireless link comprised of hardware and software that enables full duplex (transmit & receive) communication of audio signals between two points. The other half of the wireless link can include another RF XCVR. A MMI FW 67 refers to software that controls the Man Machine Interface and that enables a particular user experience to be achieved, including how the visual cues, audio cues, or button presses allow the user to operate the product. Typically these functions are implemented on a microprocessor or digital signal processor (DSP) and may be combined with functions of the RF XCVR 65 and audio processing such as noise removal, echo cancellation and frequency equalization In another embodiment, the base unit can be a desktop base unit that is adapted for individual use and can be located, for example, in the office of a user. The desktop base unit can include at least one PMM, which can be used with the desktop base unit and/or with other base units, as is described in more detail below. The desktop base unit can also include a USB plug-n-play charger and/or a transceiver base. In one exemplary embodiment, the charger and/or transceiver can be integrated in a PC, laptop, handheld device, or any computing device. A number of different PC interface bus technologies can be used, including, by way of non-limiting example, Ethernet, Firewire, WiFi, IR, Serial Port (RS232), Parallel port (IEEE), and PCMCIA interface.

A Flash chip can be included with the base unit which can store software needed to operate the base unit. A person skilled in the art will appreciate that any chip capable of storing software can be used. The software provides a variety of functionality for the base unit as described below. The desktop base unit has similar software functionality.

The base unit and desktop base unit can also include one or more antennas. The desktop base unit can incorporate dual antennas, with normal ('slow') diversity control in the first instance, with an option for Fast Antenna Diversity as a software upgrade. Fast antenna diversity can be accomplished by having a receiver sample the received signal strength from each of two different antennas, and then choose to receive data transfer on the better of the two options. The rate at which the receiver evaluates and selects which antenna to use is what decides if fast or slow diversity schemes are being used. Fast schemes will use switching frequencies on the same order as a single frame rate for data packets, where as slow diversity schemes will only change over multiple or many multiples of data packets. The base unit can have 'slow' antenna diversity per baseband, with options for Fast Antenna Diversity. Eight RF connections can be combined via four switches into four external antenna connectors The switches can control time-multiplexing between two pairs of Radio Fixed Parts (RFP). The time-multiplexing switches can be controlled by an output from RFP 1, allowing the same I/O pin to be used as a sync master/slave selector input on RFP 0. The antennas from each pair of RFPs can be combined with passive splitter/combiners, allowing each pair of RFPs to operate in a common time slot. This can result in only two external antenna connections, but at the penalty of at least 3 dB less link budget.

Ease of setup, use and operational status are driven by the proper design and implementation of the system operating software. The system is designed such that the operation of LEDs and buttons provide visual and tactile status in an intuitive manner. Audio processing and handling are important to far-end performance results. Examples include: combining of audio channels, gain control, and echo-cancellation. Smart power management of the PMMs allows increased battery life by using low power modes when possible.

FUNCTIONALITY OF THE SYSTEM

Interoperability Between the PMMs and/or Table-Top Microphones and/or Audio Adapters and the Base Units The following are operational features of the preferred embodiment of the PMM, the table-top microphone, the audio adapter, and the Base Unit. It should be understood that the system described below can be used with PMMs only, table-top microphones only, audio adapters only, or any combination of PMMs, table-top microphones, and audio adapters.

PMM features include a functionality that operates when the PMM is removed or inserted into a base unit. For example, the PMM can automatically link to a base unit by RF whenever it is removed from the charger. If the PMM is "registered" with the base unit, a base audio channel is assigned to the PMM. The PMM can also automatically mute the microphone when it is removed from the charging base, with the mute status indicated via a PMM LED 16 (e.g., flashing red), as shown in FIG. 1A. This allows users to 'silently' attach the PMM before going live with their audio. Once the PMM is in place, the user can activate his or her audio by pressing the mute/unmute button 14 shown in FIG. 1A, and the LED will indicate 'live audio' by, for example, flashing another color (e.g., blue or green). When a PMM is inserted into a base unit, the PMM can automatically shut down the RF link. When recharging begins, the recharge status can be indicated by the PMM LED 16. The PMM unit registration is also updated when it is inserted into the base unit.

The PMM can automatically enter into a 'power save' mode after long periods of inactivity. This can be accomplished when there is no microphone signal, no state change and/or no motion for a set time period. For example, a general purpose I/O pin on the PMM's main processor can be driven by an analog detection circuit that provide digital high and low conditions based on a threshold level of audio input on the PMM microphone line (ex. 1-2 mV rms). A timer can be started when no audio was detected, and once the timer reached a 'time-out' period (ex. 15 minutes), then the PMM can initiate a low-power state, removing the wireless link. The PMM can then wake up when placed into the charger base unit or when the mute button was pressed. This feature prevents the PMM from running out of battery when it is left on the table and is not returned to the charger after a conference. Alternatively, during this mode the microphone can be monitored by the base unit with which it is registered, and the PMM returned to 'active' mode by the base unit when the PMM microphone outputs an audio signal above the threshold level.

A number of other functions can be employed by the PMM, including that the PMM can signal the user when it has left the range of the base unit, for example, by vibrating and/or beeping when the user leaves the range. When out of range, the microphone can be automatically muted and the PMM can enter an 'inactive' mode in which the PMM audio output is monitored. This prevents users from wearing a PMM back to their office or home. The PMM can also employ 128-bit encryption on digital audio data, as well as RF power limiting (PMM radiates less power when closer to the base unit), advance spread spectrum and frequency hopping techniques, all ensuring maximum security. The PMM can register with base unit at contact with the base unit, allowing the PMMs to be 'hot swappable' between base units, thus allowing administrators greater flexibility in configuring their systems. This feature will be discussed in further detail below.

Base unit features include features to control communication between the PMMs and the base unit. A 'Mute' button 37 can concurrently mute/unmute audio for all active PMMs and the current status of the PMMs can be indicated with LEDs on all PMMs and on the base unit. A 'range-control' knob 36, 64 (shown in FIGS. 2A and 4A) at the base unit can allow the system administrator to limit the RF operational range between the base unit and all the registered PMMs. In one embodiment, the range can be set from 30 ft. to 300 ft. This can be accomplished by setting a PMM transmit power or a base unit received signal strength threshold. This is a security feature as well as a power-saving feature.

The base unit can automatically assign the next available audio channel to an unregistered PMM (preferably, there are 12 channels allowed per base, but that is a convenience issue, not a design issue) when it is placed into the 'Register Port' on the base unit. Successful registration will be indicated via the PMM's LED (e.g., 5 rapid flashes of the LED).

Rack-mount base unit (FIGS. 2A and 2B) can include audio ports for each individual PMM channel (for example, up to 12 PMMs) as well as a 'conferenced' audio port which combines all PMM channels together intelligently using automatic gain control, microphone voice switching, and mix/minus techniques. The single PMM holder 38 on this base unit provides PMM registration capabilities. When this base unit is used in place of an integrated Base/Gateway/Charger, the charging base 50 shown in FIGS. 3A and 3B can be used to hold and recharge the PMMs when they are not in use.

An additional feature is the 'Clear Registration' button 34, 62, (located on integrated Base/Gateway units 30, 60). When pressed, the pairing information between the base unit and all PMMs is cleared. This allows only PMMs that are registered for a particular call to be active. This is an optional security feature.

A 'register port' 52 can be included in the charging-only base 50, or the integrated base 60 shown in FIGS. 4A and 4B. In the charge-only base unit, a radio link can then enable PMM registration with the rack-mount base unit.

An additional processor 39, FIG. 2B, can be included in any of the base units for this invention. Processor 39 can be used for back-end audio processing such as speech recognition, automatic transcription processing, and data mining. Further, the base unit functionality can be built directly into a speaker phone or a videoconferencing unit, rather than be accomplished as a stand-alone device. This integration can allow the base unit to also perform the functions of a traditional speaker phone/videoconferencing unit when the wireless conferencing aspect is not necessary.

Figure 5:
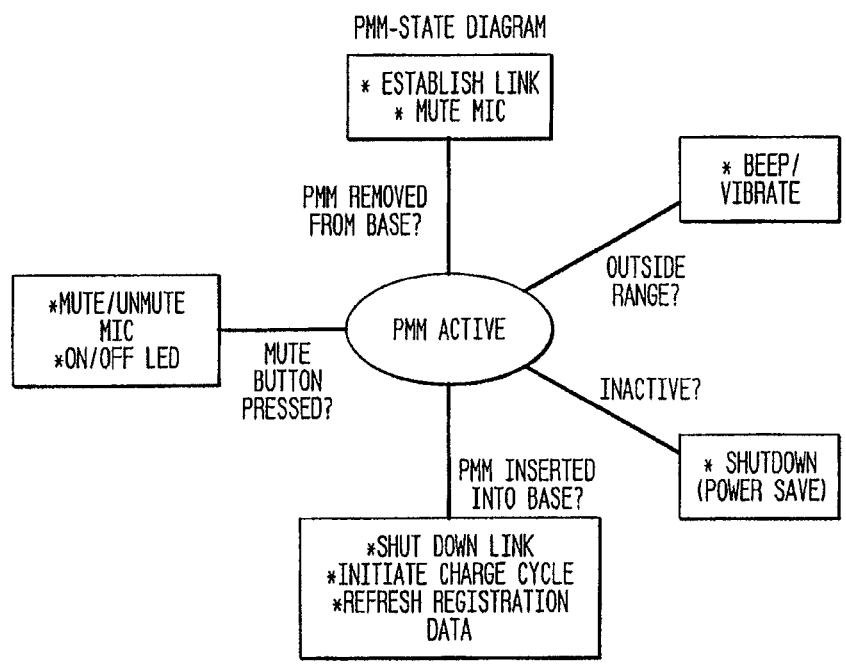
FIG. 5 is a state diagram of an embodiment of a PMM for the invention.
Figure 6:
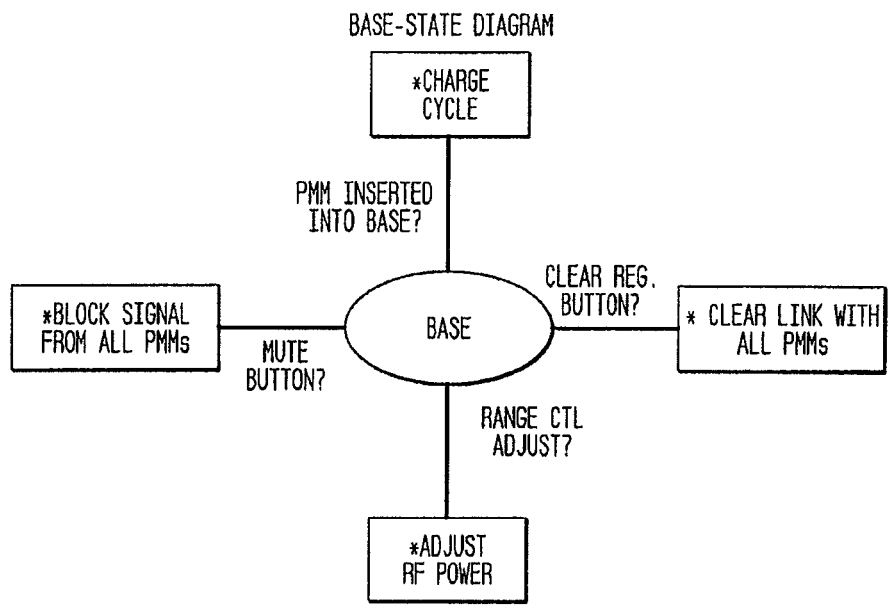
FIG. 6 is state diagram of an embodiment of a base unit for the invention.

The functionality described above is accomplished through custom firmware that controls audio processing, power management and the RF transceiver functions. Additionally, all LED indicators and functionality of user interfaces are controlled through this combination of embedded firmware and processors. FIG. 5 'PMM—STATE DIAGRAM' and FIG. 6, 'BASE—STATE DIAGRAM' disclose further functional and operational details.

The ability to provide a modular system hardware architecture allows customers to buy only the correct number of PMMs for the room they are equipping. As an example: a primary base unit can have all the power, audio and MMI interfaces, as well as, for example, 4 PMMs. The customer can then buy an extension base with 4 PMMs that attaches through a connector to the primary, and will automatically connect audio, power, etc., from the primary base. The extension base will not require full interface connections, power supply or base radio chipset. The PMMs in the extension bases will link up to the radio in the primary base. Two or more extension bases can be added to a primary base, allowing for additional PMMs to be available to the room.

The configuration of the above system allows the PMMs to work with multiple transceivers in different locations within an enterprise. To accomplish this feature, a PMM can tap into a charge base in a particular location, such as either an executive or a desktop system. The remote unit will automatically link with that system. In order for this feature to function, in one embodiment, a one-time pairing between the PMM and the base unit must be accomplished in order for that PMM to tap into that base unit. In another exemplary embodiment, tapping can be eliminated using RF detection and ID management to allow for automatic detection and pairing of a PMM to a base unit.

In one embodiment of the invention, the system, utilizing wireless technology, is based on a customized version of DECT (1.9 Ghz in the United States, or 1.8 Ghz in Europe) which operated in a license free ISM band. This customization allows for wideband audio transmission (for example, 16-17 kHz for 8-8.5 kHz audio bandwidth), up to 36 channels to be in the air at the same time without degraded audio quality, and with encrypted data transmission. A variety of other wireless platforms can be utilized to achieved similar performance, including, by way of non-limiting example, WDECT (2.4 Ghz), DECT (5.8 Ghz), Bluetooth (2.4 Ghz), ultra wide-band, ZigBEE, InfraRed, and any direct sequence spread spectrum (DSSS) or frequency hopping spread spectrum (FHSS) proprietary radio architecture operating on ISM bands.

Selection of the proper radio architecture/standard is important to obtain the expandability/modularity, full duplex audio capabilities, total number of PMMs, power management, range, small size and cost to manufacture. Being able to secure country approval to use the product 'globally' requires operational frequencies within particular ISM bands. For these reasons, the DECT radio standard and associated chipsets that are commonly used in mobile & cordless phone systems are ideal for use in the invention. Being able to provide wide-band audio over the radio link is desirable but can require a derivative to the DECT standard chipsets be developed.

Variations on the base/microphone can be made available containing other types of wireless microphones. Examples include: wireless tabletop sector microphones for conference with re-configurable tables, wireless handheld microphones for auditoriums and roaming interviewers and headsets.

A person skilled in the art will appreciate that the interoperability between the PPMs and the base units described above also applies to the interoperability between the table-top microphones and the base units and the audio adapters and the base units described herein.

Personal Microphone Module, Table-Top Microphone, and Audio Adapter Registration A personal microphone module (PMM), a table-top microphone, and an audio adapter can register with one or more base units. In one embodiment, a base unit can include eight PMMs, with each PMM being paired to one of the eight channels on the rack base unit (as shown in FIG. 2A), while a desktop base unit can include a PMM paired to a USB base on the desktop base unit. It should be noted that any PMM can be paired to any channel. For example, in this embodiment each channel on the rack base unit can store up to eight paired PMMs, and any of these can connect with that channel if that channel is available, e.g., not being used by another PMM. This allows for a PMM to pair with multiple base units.

In one exemplary embodiment, the method of pairing a PMM with a base unit includes muting the PMM (for example, the LED on the PMM is red to indicate that the PMM is muted). The user then presses the desired channel button on the rack base unit (or the mute button on the desktop base unit), until the LED signals that the two devices are paired, for example, when the LED remains red. A number of methods can be used to confirm the pairing, including, in one exemplary embodiment, a green flash on the LED of the PMM and/or the base unit. Following the confirmation that the pairing was successful, an audio link between the two devices is established.

If a PMM is paired with multiple bases, a user can link that PMM with any of these base units. This is achieved by "tapping in," which involves docking or removing the PMM from the charge base for the base unit that the user wishes to be paired to. This allows the PMM to know which system it should be operating with. In order for the pairing to be accomplished, the paired channel must be available (no other PMM can be linked to that channel). In order to tap into a base unit, the user must be physically present, which adds a security benefit of preventing users who are unauthorized to join a certain conference from tapping in to the base unit during that time.

A person skilled in the art will appreciate that registration process described above relative to the PMMs also applies to the table-top microphones and the audio adapters described herein.

Video Conferencing and User Tracking

Figure 7:
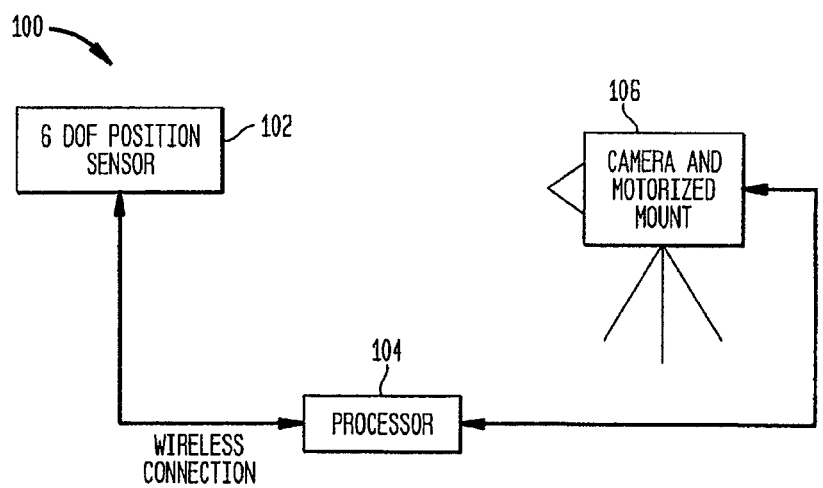
FIG. 7 is a schematic diagram of an embodiment of the system of the invention which also includes video tracking of users.

This system can also be expanded to achieve video conferencing. A standard video conferencing system can be used but with the wireless audio system disclosed herein. Alternatively, the invention can include video conferencing in which the speaker is automatically tracked by a video camera. A simplified schematic diagram of one embodiment of such an automatic video tracking scheme is shown in FIG. 7. Video camera and motorized camera mount 106 is controlled by processor 104 that is in wireless communication with user position sensor 102. Preferably, position sensor 102 is a six degree of freedom tracking system such as are known in the field. Examples of six degree of freedom tracking systems are available from InterSense, Bedford, Mass. Tracker 102 provides information establishing the position in space of the person carrying a PMM or a conventional wireless microphone coupled to an audio adapter. Location information from the one or more position sensors 102 is interpreted by processor 104, which sends appropriate drive signals to motorized camera 106 so that the camera is moved as necessary to keep the speaker framed by the camera. The six degree of freedom position sensing system can be integrated into the PMMs and the audio adapters, or accomplished separately and then carried on the user's person.

Tracking capability can be implemented for multiple PMMs, audio adapters, and table-top microphones by having the user press a function button on the PMM and/or table-top microphone and/or audio adapter when the user is ready to talk, or otherwise when the user desires to be tracked by the camera. The camera position can then be controlled in response to function button presses received by the base unit. There can also be another version of an 'automatic' mode to track multiple PMMs, audio adapters, and table-top microphones, where the microphone audio levels can trigger the camera to go to the highest level of incoming audio (presumably the person speaking). If more than one person begins talking at the same time, the camera system can stay on the current PMM, audio adapter, or table-top microphone until there is only one person talking, then move to that person. There can be minimum time gates applied to avoid having the camera move when somebody coughs or makes a brief comment but doesn't need to be on camera.

A person skilled in the art will appreciate that the video conferencing and user tracking systems described above apply to the PMMs, the table-top microphones, and the audio adapters.

The inventive system can be adapted to be remotely controlled, accessed and/or updated through the use of a network interface in the base station (e.g., using Ethernet, IP or wireless IP).

The primary implementation of this system is targeted at the audio/video conference call market. Other applications include, but are not limited to, medical/legal dictation. In this application the audio track is securely transmitted and captured electronically for future reference, archival purposes and/or to meet legal requirements.

Selectable Radio Slot Configuration (including Asymmetric Modes)

This radio architecture approach allows for a user selectable range of data rates made available to either uplink or downlink direction in a bi-directional wireless audio link. In general, it enables the ability to select the amount of audio bandwidth and overall quality of the audio (for example, level of error correction, etc.). For example, if the user wants to place an emphasis on the quality of the audio from a microphone back to the base (downlink), a mode can be selected with 96 Kb/S capacity for that direction and only 32 Kb/S in the uplink direction. Automatically the audio bandwidth, CODEC and error correction used for the higher data rate will provide an error corrected 20 Khz audio bandwidth, where as the uplink direction may only use 7 Kzh audio bandwidth without error correction. If the user places equal emphasis on uplink and downlink, then the mode for 64 Kb/S in each direction is selected and the resulting audio bandwidth and quality (quality is distortion and signal to noise ratio) are the same in both direction.

Selectable Channel Density

This feature allows the user to decide whether they want more microphones to operate in a given physical area with limited audio bandwidth and lower audio quality or fewer microphones operating with higher audio bandwidth and higher audio quality. For example, the user can select 32 Kb/S for both uplink and downlink, which can allow double the number of microphones to operate in the same area, versus a selection of 64 Kb/S in both directions which can enable better audio bandwidth and quality but half the number of microphones can operate in the same area. In one exemplary embodiment, any of the base units described above can include a channel density controller for adjusting the audio bandwidth to control the number of communication modules that can communicate with the base unit.

Selectable Muting Scheme

This feature allows users to select a muting control scheme to control the way in which the wireless audio system mutes the audio channels going from the various communication modules to the base unit. For example, the user can choose to enable: (1) the ability to have individual muting done at each communication module, (2) a scheme such that when any communication module is muted, all of the communication modules will be muted, (3) a hybrid approach, where, for example, table-top microphones work as 'mute all', and wearable or XLR audio adapter microphones can be individually muted, and (4) a scheme in which the user can select whether the actual audio muting is done internal to the audio system, such as the base unit, or it passes the audio signal, along with command signals, to external equipment to do the muting while allowing echo cancellers in the external processor to remain active during muted sessions. In one exemplary embodiment, any of the base units described above can include a muting controller that is configured to select a muting scheme to control an audio channel to each communication module to selectively mute the communication modules.

Wireless Software Updating for Communication Modules

This capability allows the communication modules to receive updates to their operational software through their radio connection with the base unit, rather than needing to be physically connected to a programming base. This allows new software to be installed on the communication modules by connecting only to the base station via an Ethernet connection. A single installation of new and/or updated software onto the base station can update both the base station software as well as all the communication modules that are linked to the base station. If the communication modules are not linked wirelessly to the base station at the time of the software update, the communication modules will be updated the next time they are used with that base station. For example, the next time a PMM is removed from a charger base and linked with a base unit, the PMM can update with the software update automatically.

Wireless Charging for the Communication Module Battery

Figure 14:
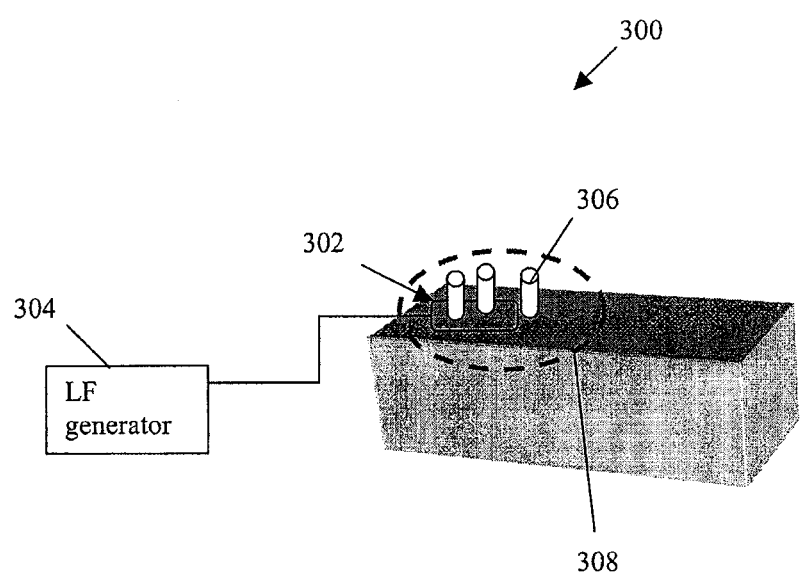
FIG. 14 is a perspective view of an embodiment of a base unit configured to wirelessly charge a battery of a communication module.

This capability allows batteries of the communication modules to be charged wirelessly without the need to return them to the base units or a charger base. For example, a microphone can be left anywhere rather than having to return them to a charger base after use. In one exemplary embodiment, an induction method can be used to wirelessly charge the communication modules. In the illustrated embodiment shown in FIG. 14, the induction method of wireless charging is enabled by a charger base unit 300 that includes an inductive antenna, such as an inductive loop 302, and a low frequency radio, such as an LF generator 304, which can be positioned separate from the base unit 300 and connected to AC main power. Communication modules 306 can be equipped with inductive receiving antenna elements and corresponding rectifier electronics to convert the LF signal into charge current for the battery when the communication modules 306 are located within a charge or collection area 308. The collection area can be a decorative bowl that has the inductive charging technology embedded, and communication module users can leave the communication modules in the bowl at the end of the meeting, rather than having to place them specifically into slots on a charging station.

Programmable Audio Equalization

This capability pertains to the ability of a base unit of an audio system to be able to recognize different types of communication modules, including but not limited to PMMs, tabletop omnidirectional microphones, tabletop unidirectional microphones, and XLR audio adapters, and then apply custom audio equalization (EQ) to achieve particular desired tonal qualities. This can be achieved in a variety of ways. In one exemplary embodiment, custom audio equalization can be all done automatically by the audio system, but the user can load in custom EQ profiles for each type of communication module through a graphical user interface (GUI), which can then be applied automatically by the base unit of the audio system during operation. The GUI can be coupled, for example, to the base unit to allow a user to enter the custom EQ profiles for the communication modules.

Novel Power Conservation Techniques

In order to achieve longer battery life on the communication modules, the communication modules have the ability to go into a 'Park' mode with the base station. A 'Park' mode is a mode in which the audio system conserves the power of the communication modules. In Park mode, the communication module and the base station agree not to stream full duplex audio data, but rather, to maintain a minimal link passing only occasional status checks and timing data. This allows the communication module to shut down parts of the circuitry to save power while in park mode. Various types of 'Park' modes can be utilized. In one embodiment, a Voice activated Park mode can be used. In this mode, the communication module can monitor the audio being received for both level and spectral signature to determine if it is speech. Upon determining there has been no speech for a period of time, the communication module will enter a 'park' mode. In another embodiment, a Mute Activated Park Mode can be utilized. In this mode, when a communication module is muted (e.g., red LED flashing) it will go into park mode after a certain amount of time. The communication modules will exit park mode when the communication module is un-muted. A person skilled in the art will appreciate, however, that various other types of 'Park' modes can be utilized to conserve the power of the communication modules.

Although specific features of the invention are shown in some drawings and not others, this is for convenience, as the various features may be combined in other manners in accordance with the claimed invention.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A wireless audio system, comprising:
a base unit configured to support a fixed number of audio channels and to removably store, recharge, and communicate with each one of a plurality of wireless microphones, the base unit having a channel density controller operating to control the number of audio channels available to an uplink separately from the number of audio channels available to a downlink in a bi-directional wireless audio link assigned to each one of the plurality of the wireless microphones;
wherein the number of wireless microphones that can communicate with the base unit at a point in time is determined by the number of audio channels available to each of the bi-directional links.

2. The wireless audio system of claim 1, wherein the wireless microphone is adapted to be removably coupled to a user, and to communicate wirelessly with the base unit.

3. The wireless audio system of claim 1, wherein a wireless audio adapter is configured to removably couple to the wireless microphone and to communicate wirelessly with the base unit.

4. The wireless audio system of claim 1, wherein each wireless microphone is mutable.

5. The wireless audio system of claim 4, wherein the mutable wireless microphone is a directional microphone.

6. The wireless audio system of claim 4, wherein the wireless microphone is automatically muted when the wireless microphone is removed from the base unit.

7. The wireless audio system of claim 4, wherein each wireless microphone further comprises a microphone mute-status indicator.

8. The wireless audio system of claim 7, wherein the microphone mute-status indicator comprises an indicator light carried by the wireless microphone.

9. The wireless audio system of claim 1, wherein a wireless link is automatically established between the wireless microphone and the base unit when the wireless microphone is removed from the base unit.

10. The wireless audio system of claim 9, wherein the wireless link is automatically terminated when the wireless microphone that had been removed from the base unit is returned to the base unit.

11. The wireless audio system of claim 1, wherein the base unit performs audio mixing and automatic gain control for the wireless microphones that are wirelessly linked to the base unit.

12. The wireless audio system of claim 1, wherein each wireless microphone uniquely registers with the base unit, is inactivated, and uniquely registers with a further base unit.

13. The wireless audio system of claim 1, wherein the base unit further comprises a muting controller that is configured to select a muting scheme to control an audio channel to each wireless microphone to selectively mute the wireless microphone.

14. The wireless audio system of claim 13, wherein the muting controller mutes one or more of the wireless microphones by blocking the audio signal from the wireless microphone.

15. The wireless audio system of claim 1, wherein each wireless microphone includes a battery that can be charged wirelessly.

16. The wireless audio system of claim 15, wherein the base unit includes an inductive antenna configured to wirelessly communicate with an inductive receiver in the wireless microphone to allow for wireless charging of the wireless microphone.

17. The wireless audio system of claim 1, wherein the number of channels available to each one of the wireless microphones is user selectable.

* * * * *